United States Patent Office 3,235,538
Patented Feb. 15, 1966

3,235,538
METHOD OF BROMATING INTERPOLYMERS OF AN ISOOLEFIN AND POLYOLEFINS
Jean-Marie Massoubre and Georges Louis Travers, Clermont-Ferrand, France, assignors to Compagnie Generale des Etablissements Michelin, raison sociale Michelin & Cie, Clermont-Ferrand, France
No Drawing. Filed Dec. 27, 1961, Ser. No. 162,597
Claims priority, application France, Dec. 29, 1960, 848,264
15 Claims. (Cl. 260—85.3)

The present invention relates to a method of modifying interpolymers of an isoolefin and polyolefins, in particular, butyl rubber, by means of bromine and more particularly by means of novel brominated compounds.

It has been known that the characteristics of the copolymers consisting of a larger proportion of an isoolefin, such as the isobutylene, and a smaller proportion of one or several polyolefins, in particular, the copolymers of isobutylene and isoprene in the ratio of 98 to 2, known as butyl rubber, are favorably modified by the addition of bromine atoms to the structure of such polymers. Various methods of introducing bromine into these elastomers are known.

One of these methods includes the employment of elemental bromine in solution and at a temperature below 0° C., thus requiring a cooling installation and great inconvenience.

Another method requires various organic vehicles for bromine but, all vehicles which have been used to date are comparatively costly; furthermore, they require a considerable proportion of organic products in relation to the bromine carried. A bromine vehicle which has been used is succinimide. However, this compound has the disadvantages indicated above and, furthermore, the bromine derivative is relatively soluble which complicates the obtention of such derivative.

In accordance with this invention, a brominated aliphatic diamine is used, in particular, brominated ethylene diamine or brominated hexamethylene diamine, prepared as described in our United States application Serial No. 162,582, filed of even date, now abandoned.

In accordance with one feature of the invention, a quantity of brominated aliphatic diamine which equals a concentration of 2 to 5.5% by weight of bromine in relation to the interpolymer is used. Among the other features, a non-brominated aliphatic amine may be included in the reaction mixture acting as a regulating agent.

The method in accordance with the invention may be practiced in several ways. In accordance with one method, a brominated aliphatic diamine is prepared in an aqueous suspension containing the interpolymer in the form of small granules or particles, for example, in the suspension obtained after copolymerization and prior to drying and putting the interpolymer into a finished form. The brominated aliphatic diamine needed for the total amount of interpolymer to be modified may be prepared in the presence of only a part of the interpolymer, for example, approximately one-fourth, and this portion which is very rich in bromine is mixed with a non-brominated portion of the interpolymer to obtain the desired bromine content. This method does not require any special apparatus or additional stages in the preparation of the interpolymers and no heat problem arises. It is sufficient to add to the aqueous suspension of the butyl rubber an aliphatic diamine, such as ethylene diamine or hexamethylene diamine, put into solution in water containing Br$^-$ ions, with a pH of 3 to 5, in the presence of an oxidizing agent, such as dilute potassium or sodium hypochlorite which may contain some sodium chloride (Javelle water). The brominated aliphatic diamine is prepared in situ and as it is formed, it mingles directly with the butyl rubber.

In one method wherein the brominated aliphatic diamine acts on only a part of the butyl rubber to be brominated, the brominated butyl rubber is drained and subsequently incorporated into the likewise drained but not brominated butyl rubber. Mixing of the two parts of butyl rubber may be effected in any suitable type of mixer. An advantage of the above-described method of brominating a part of the interpolymer is that a comparatively small-sized vat in relation to the total quantity of brominated interpolymer finally obtained may be used. Inasmuch as the reaction produces oxidizing effects and the oxidation resistant materials from which the vat must be made are generally costly, a substantial savings is obtained by the use of a smaller vat or vats.

Mixing of the two parts of the interpolymer, e.g. butyl rubber, one brominated and one non-brominated, is much easier and can be completed quicker than when the brominated diamine is prepared separately and then added to the interpolymer in a dry or aqueous state. Furthermore, adsorption of bromine by the interpolymer is more complete and more uniform, thereby resulting in the production of a product of greater homogeneity and with highly uniform physical and chemical characteristics with a minimum expenditure of work and power.

In accordance with a modification of the invention, a non-brominated aliphatic amine, such as ethylene diamine, hexamethylene diamine, ethanolamine or diethanolamine, is added to a mixture of an interpolymer of an isoolefin and a polyolefin and a brominating agent of the kind referred to above. Such an addition agent completes the neutralization of the medium. It may be effected at the moment of reaction of the brominating agent on the interpolymer, however, it may be effected later on, for example, any time during a period of twenty-four hours.

Depending on the time at which the addition agent is added to the interpolymer and the brominating agent or their reaction product, two important characteristics of brominated interploymers can be controlled. For example, the plasticity of butyl rubber and its affinity for natural rubber or other kinds of synthetic rubber can be modified favorably. The plasticity of brominated butyl rubber increases in direct proportion to the promptness of addition of the non-brominated aliphatic amine. The affinity for natural rubber improves as the time of addition is delayed. However, the delay should not materially exceed twenty-four hours.

The brominated butyl rubber prepared in accordance with the present invention may be subjected to the same drying operations as those customarily undertaken for non-brominated butyl rubber, without any damaging effects as regards the properties of plasticity and adhesiveness.

In accordance with the invention, another method of brominating interpolymers of isoolefins and polyolefins involves the preparation of the interpolymer and the brominating agent separately and thereafter mixing them, in dry condition, at a temperature below 50° C. At mixing temperatures below 50° C., only thin sheets of the interpolymer may be treated because of slow diffusion of the brominating agent. On the other hand, by adding water in an amount between 0.5 and 3 parts by weight based on the amount of brominating agent, it is possible to mix the reagents in an internal mixer, in spite of the temperature of 80 to 90° C. which ordinarily prevails in this type of apparatus. Brominated butyl rubber which is obtained by either method may be put to use immediately following its preparation. However, preferably it may be stored for approximately twenty-four hours in order to permit the reaction to run its course and to improve the ability of the butyl rubber to adhere to natural rubber.

As in methods wherein the brominated aliphatic diamine is formed in situ in an aqueous butyl rubber suspension, high plasticity and satisfactory affinity for natural rubber and other synthetic rubbers can be obtained by adding non-brominated aliphatic amine to the mixture of separately prepared butyl rubber and brominated aliphatic diamine.

Interpolymers which are modified by bromine in accordance with the invention have a plasticity which is superior to that of the interpolymers modified by bromine in accordance with known methods as referred to explicitly above and they also have, in comparison with the latter, a compatibility which at least equals that of the latter, for natural rubber and other synthetic rubbers.

The following non-limiting examples illustrate the preparation of brominated butyl rubber in accordance with the invention.

EXAMPLE 1

This example makes use of butyl rubber in the form of granules or particles in an aqueous suspension. To 20 liters of water containing in suspension 5 kg. of butyl rubber of 301 type (manufactured by Polymer Corporation Limited, Canada), are added 46 cm.$^3$ of hydrated ethylene diamine, commercial quality (850 g./liter), 308 g. of potassium bromide and hydrochloric acid in an amount sufficient to adjust the suspension to a pH value of 4.5. Thereafter, potassium hypochlorite water (4.2 N) is added and sufficient HCl is introduced to maintain a pH of 4.5. The operation is finished when 1.14 liters of dilute potassium hypochlorite (Javelle water) have been added. Thereafter the reaction product is drained, dried and formed in accordance with conventional practice.

EXAMPLE 2

In the following example, dry brominated diamine is incorporated into butyl rubber. Butyl rubber of the same quality as the one mentioned in Example 1 is treated in a cylinder mixer and care is taken that the temperature does not exceed 50° C. A sheet of butyl rubber is drawn from the mixer and is conveyed through a cooling circuit and is reintroduced into the mixer. For brominating 5 kg. of butyl rubber, 200 g. of brominated ethylene diamine is gradually added to the mixer over a period of approximately ten minutes, whereafter mixing is interrupted and the product obtained is stored for twenty-four hours approximately prior to being used.

EXAMPLE 3

Into an interal mixer of the Werner type and during a period of approximately thirty minutes, 50 kg. of butyl rubber and 2 kg. of brominated ethylene diamine which has been moistened with approximately 3 liters of water are introduced so as to maintain the temperature of the mixture between 60 and 70° C. The resulting brominated butyl rubber thereafter is passed through a calender and brought into sheet form.

EXAMPLE 4

Butyl rubber and brominated ethylene diamine are combined as in Example 3, but approximately five minutes after the mixing has taken place, 100 cm.$^3$ of hydrated ethylene diamine (85%) is added.

EXAMPLE 5

The procedure set forth in Example 2 is followed with the exception that the 200 grams of brominated ethylene diamine is replaced with 230 grams of brominated hexamethylene diamine.

EXAMPLE 6

The procedure set forth in Example 3 is followed but 2.3 kg. of brominated hexamethylene diamine is added to the butyl rubber instead of 2 kg. of brominated ethylene diamine.

EXAMPLE 7

In the process of Example 6, 100 g. non-brominated hexamethylene diamine is added five minutes after mixing of the brominated hexamethylene diamine with the butyl rubber has been effected.

The samples made in accordance with the foregoing examples and samples of commercial brominated butyl rubber were subjected to plasticity measurements (Williams method), and tests to determine the comparative fluidity measured by means of a method of extrusion at a high degree of shear, and to tests to determine their affinity for natural rubber. Tables I and II illustrate, respectively, the results of the measurement of plasticity and fluidity.

*Table I*

PLASTICITY

|  | Commercial Brominated butyl rubber | Brominated butyl rubber as per Examples 1 to 7 | | | | | | |
|---|---|---|---|---|---|---|---|---|
|  |  | 1 | 2 | 3 | 4 | 5 | 6 | 7 |
| Fresh product | 3.90 | 2.18 | 2.52 | 2.35 | 2.17 | 2.54 | 2.49 | 2.17 |
| Product stored 6 months | 4.49 | 2.26 | 2.60 | 2.42 | 2.25 | 2.61 | 2.57 | 2.30 |

All butyl rubbers of Examples 1 to 7 have greater plasticity than that of the commercial brominated butyl rubber. The improved characteristics obtained by introduction of a non-brominated diamine are shown in Examples 4 and 7. Likewise, after storing for six months, the plasticity loss of the commercial brominated butyl rubber is approximately 15% while the loss of the brominated butyl rubber obtained in accordance with the invention is approximately 3%.

*Table II*

FLUIDITY

|  | Ethylene diamine 0.2% | Ethanolamine 0.4% | Diethanolamine 0.4% | Commercial butyl rubber |
|---|---|---|---|---|
| Incorporated prior to brominated diamine | 60 | 48 | 36 |  |
| Incorporated after brominated diamine | 16 | 17 | 18 | 2 |

The measurements of fluidity establish, (1) that the fluidity of the mixtures in accordance with the invention for all practical purposes no longer varies at the end of two or three weeks following their preparation, and (2) that their fluidity is clearly greater if incorporation of the non-brominated amine precedes that of the brominated diamine. In all cases, the new products are superior to commercial butyl rubber.

The affinity for natural rubber of the butyl rubbers tested was determined for the products obtained in accordance with the seven examples and for the prior commercial product, by measuring the force required to destroy the adherence between a sheet consisting of a mixture based on vulcanized brominated butyl rubber in contact with a sheet consisting of a mixture based on natural rubber. The values thus measured, expressed in kg. of traction per 1 cm. width of test piece are set forth in Table III. They are in all cases the average of three measurements.

Table III

| | Commercial brominated butyl rubber | Brominated butyl rubber as per Examples 1 to 7 | | | | | | |
|---|---|---|---|---|---|---|---|---|
| | | 1 | 2 | 3 | 4 | 5 | 6 | 7 |
| Fresh product | 9.8 | 10.5 | 10.3 | 11.0 | 10.4 | 11.6 | 6.6 | 8.2 |
| Product stored 6 months | 8.8 | 10.0 | 9.8 | 10.4 | 9.9 | 11.0 | 6.1 | 7.7 |

The affinity of freshly prepared brominated butyl rubber made in accordance with the present invention is, on the average, at least as good as that of freshly prepared commercial brominated butyl rubber and much superior after storage for six months.

From the foregoing description of the present invention, it will be apparent that improved, simplified and more readily controllable methods of bromating interpolymers of the kind described are provided. The new processes are susceptible to considerable modification as shown by the illustrative examples. Accordingly, the invention should not be considered to be limited other than as defined in the following claims.

What is claimed is:

1. A method of producing brominated products comprising mixing and reacting a butyl rubber which has a major portion of an isoolefin and a minor portion of a polyolefin with a brominated saturated aliphatic diamine, said brominated saturated diamine being present in an amount sufficient to provide a concentration of bromine between about 2 and 5.5% by weight of said copolymer.

2. The method set forth in claim 1 comprising adding a non-brominated aliphatic amine selected from the class consisting of ethylene diamine, hexamethylene diamine, ethanolamine and diethanolamine to said copolymer and brominated aliphatic diamine.

3. The method set forth in claim 1 wherein said copolymer and said diamine are reacted in a dry state at a temperature below 50° C.

4. The method set forth in claim 1 wherein said copolymer and said diamine are reacted in the presence of water in an amount of 0.5 to 3 parts by weight of said diamine.

5. The method set forth in claim 1 in which the brominated saturated aliphatic diamine is brominated ethylene diamine.

6. The method set forth in claim 1 in which said brominated saturated aliphatic diamine is brominated hexamethylene diamine.

7. The method set forth in claim 1 in which said brominated saturated aliphatic diamine is formed in situ and the interpolymer is in the form of small particles.

8. The method set forth in claim 7 in which said diamine is formed in situ by dissolving a saturated aliphatic diamine in an aqueous suspension of said copolymer in the presence of $Br^-$ ions and Javelle water and maintaining the pH value of said suspension between 3 and 5.

9. The method set forth in claim 8 in which about one-fourth of said copolymer is treated in water and thereafter the reaction product is mixed with the remainder of said copolymer.

10. A method as set forth in claim 7 wherein said brominated saturated aliphatic diamine is formed in situ by dissolving ethylene diamine in an aqueous suspension of said copolymer in the presence of $Br^-$ ions and Javelle water and maintaining said suspension at a pH value between 3 and 5.

11. A method as set forth in claim 7 wherein said brominated saturated aliphatic diamine is formed in situ by dissolving hexamethylene diamine in an aqueous suspension of said copolymer in the presence of $Br^-$ ions and Javelle water and maintaining said suspension at a pH value between 3 and 5.

12. A method as set forth in claim 8 wherein said brominated saturated aliphatic diamine is formed in situ in the presence of ethanolamine.

13. A method as set forth in claim 8 wherein said brominated saturated aliphatic diamine is formed in situ in the presence of diethanolamine.

14. The compound prepared by brominating a butyl rubber which has a major portion of an isoolefin and a minor portion of a polyolefin in accordance with the method set forth in claim 1.

15. A method as set forth in claim 8 wherein said brominated saturated aliphatic diamine is formed in situ in the presence of an aliphatic amine selected from the class consisting of ethylene diamine, hexamethylene diamine, ethanolamine and diethanolamine.

References Cited by the Examiner

UNITED STATES PATENTS 2,995,545  8/1961  Cottle et al. _____ 260—85.3

JOSEPH L. SCHOFER, *Primary Examiner.*

WILLIAM SHORT, *Examiner.*